Sept. 28, 1971   F. G. REUTER   3,608,238
PLANT CULTURE
Filed Jan. 27, 1969

INVENTOR
FRANZ GOTTFRIED REUTER

BY
ATTORNEY

3,608,238
PLANT CULTURE

Franz Gottfried Reuter, Lemfoerde, Hannover, Germany, assignor to Elise Erika Reuter, Lemfoerde, Hannover, Germany
Filed Jan. 27, 1969, Ser. No. 794,280
Int. Cl. A01g *31/00, 9/02*
U.S. Cl. 47—1.2                                          7 Claims

ABSTRACT OF THE DISCLOSURE

The plants are embedded in a polyurethane foamable matrix foaming a polyurethane reaction mixture about the roots of the plant.

---

Figure 1:
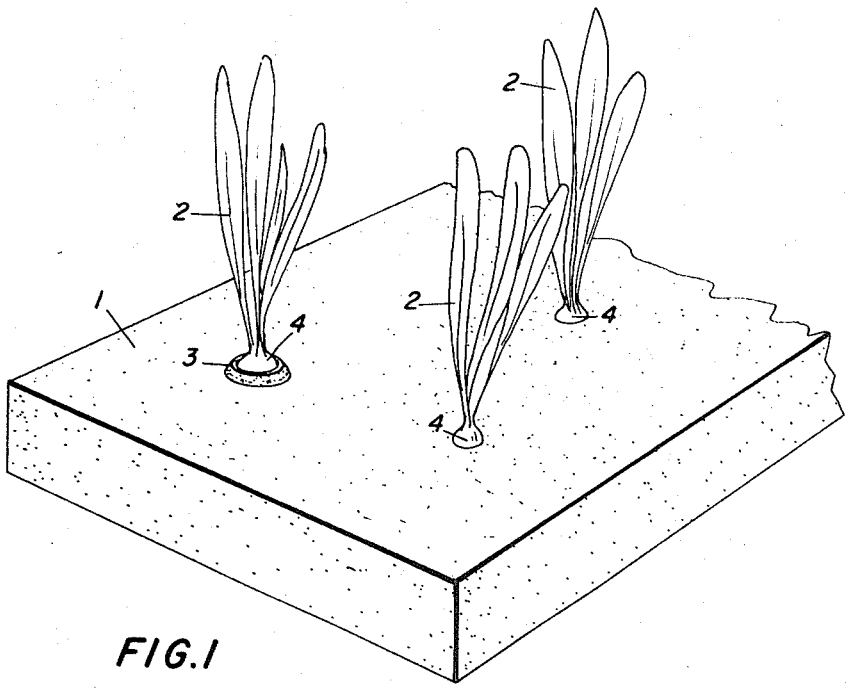

This invention relates generally to horticulture and, more particularly, to a novel method of providing a plant with a culture medium.

Plants are normally grown in soil, vermiculite, moss or the like. Flowering plants are often cultivated in pots or in beds which may be supported by a bench or similar support. In most instances, best results are obtained when the culture medium resembles that of the plant's natural habitat and is adapted to deliver the proper nutrients to the plant's root system. The heretofore available culture media are not suitable for growing all types of plants because of the tendency thereof to densify and interfere with free flow of air and nutrient to the root system.

It is an object of this invention to provide an improved method of culturing plants. Another object of the invention is to provide a novel matrix about that part of a plant which normally extends into the culture medium. Still another object of the invention is to provide a novel method of embedding that part of a plant which normally extends into a culture medium in a matrix which is devoid of the aforesaid disadvantages of the prior medium. A still further object of the invention is to provide an improved method for growing plants and particularly those plants which thrive in a porous medium.

The foregoing objects and others are accomplished in accordance with this invention, generally speaking, by forming in situ a polyurethane foam having open cells about that part of a plant which is normally embedded in a nutrient medium. It has been found that a plant having its root system embedded in a foamed-in-place polyurethane foam will grow more rapidly and bloom more abundantly than one of the same specie planted in one of the heretofore available media such as soil or the like. The invention is applicable to various types of plants having root systems which may include bulbs, rhizomes and the like.

In providing the culture medium of this invention, a polyurethane foam which is predominantly open celled is formed by disposing a liquid foamable polyurethane reaction mixture about that part of a plant normally extending into a culture medium and allowing the mixture to foam to form a matrix thereabout. Preferably, the polyurethane foam is a rigid foam. Conventional nutrient solutions are fed to the root system of the plant by applying it to the foam and allowing it to move through the open celled network into proximity with the roots.

Any of the known foamable polyurethane reaction mixtures may be used provided it produces a foam having predominantly open cells, i.e., one in which at least 50% of the cells are open cells. Preferably, however, the formulation should be one which produces a rigid foam. Many suitable foamable mixtures are disclosed in the art such as in the books "Polyurethanes," "Chemistry and Technology," volumes I and II, by Saunders and Frisch published by Interscience Publishers, 1962 and 1964. The rigid foams and apparatus for making them disclosed at pages 193–298 and in the various patents and articles referred to therein can be used to advantage in practicing this invention. It is advantageous, however, to choose a polyisocyanate for the reaction mixture having a low vapor pressure at operating temperatures and preferably, also one which when reacted with a polyol such as a polyester or polyether produces a low exotherm. For this reason, polyisocyanates derived from aniline-formaldehyde condensation products of the type disclosed at page 198 of volume II of the Saunders et al. books and a Technical Data Bulletin entitled "The Use of Crude MDI in One-Shot Polyether Rigid Foam," published by the Mobay Chemical Company, Sept. 2, 1960 are preferred. Other aromatic diisocyanates and triisocyanates including toluylene diisocyanate, napthylene diisocyanate, xylylene diisocyanate and the like can also be used. Various types of polyols preferably those having a molecular weight of at least about 200, including the poly(alkylene ether)polyols, polyester polyols prepared by esterification of a polycarboxylic acid and a polyhydric alcohol, hydroxyl polycaprolactones and the like disclosed in the art for making polyurethane foams can be used. However, best results have been obtained by first preparing a mixture of polyol such as a poly(alkylene ether)triol, stabilizer, catalyst and blowing agent and then mixing this mixture with a polymer mixture of diphenylmethane-4,4'-diisocyanate so this method is preferred.

In one embodiment of the invention wherein all parts are by weight, about 43.3 parts polyoxyethylene-oxypropylene triol containing about 65% terminal primary hydroxyl groups and 35% terminal secondary hydroxyl groups prepared by condensing propylene oxide and ethylene oxide with glycerine and having a molecular weight of about 4,600 and a hydroxyl number of about 36, about 1.3 parts dimethyl siloxane (Dow Corning #190), about 2 parts dimethyl ethanol amine, about 1.3 parts triethylamine, about 20 parts water and about 32.1 parts trichlorofluoromethane are mixed substantially uniformly. About 100 parts mixture of diphenylmethane-4,4'-diisocyanate with its polymers having an average functionality of about 2.5 are mixed substantially uniformly with each 100 parts of the mixture containing the polyol and the resulting mixture is placed around spaced rhizomes of orchid plants with the roots extending therefrom towards the top of an underlying table surface. The liquid has a creamy appearance after about 23 seconds, expands and rises up about the roots and at least the lower part of the rhizomes after about 110 seconds from pouring time and is a tack-free foam after about 120 seconds. The density of the foam is about 0.7 lb./ft.$^3$ and more than 75% of the cells in the foam are open cells. The thickness of the foam layer is about 1½ to 2 inches.

The density of the foam should preferably be from about 0.5 pound per cubic foot to about 3 pounds per cubic foot and the foam layer should preferably be from ½ inch to up to 10 inches or more in thickness.

In another embodiment of the invention, the same foaming procedure is followed but the rhizomes are wrapped in a layer of porous cloth, a thin layer of spagnum or peat moss or the like before the foamable mixture is poured over the surface of the table or other support to provide an air space between the rhizomes and resulting solid polyurethane foam. Such a space provides the roots with access to maximum amounts of oxygen, nutrient salts and water.

A group of several dozen Cattelya orchid plants that had not been growing well were divided into two approximately equal groups of rhizomes. One group was planted in a conventional soil medium and the members of the other group were spaced over the surface of a greenhouse bench next to the first group. The formulation and procedure of the first embodiment described above were used to foam a rigid matrix around the spaced rhizomes and depending roots. The two groups of rhizomes were fed the same nutrient salt solution containing a source of nitrogen, phosphorous, potash and trace elements. The light, temperature and other growing conditions were the same. The plants in the conventional medium continued to grow slowly and bloomed very little. Those placed in the polyurethane foam began to thrive and were soon growing and blooming abundantly.

Figure 2:
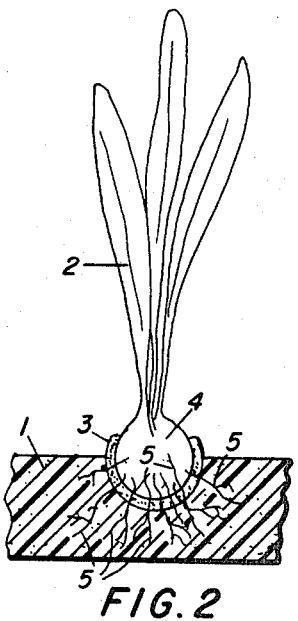

Referring to the drawing, FIG. 1 in a perspective view illustrates a plurality of plants 2 growing from a polyurethane foam matrix 1. FIG. 2 is an illustration in cross-section through a polyurethane foam matrix 1 showing roots 5 passing through a porous layer 3 into the matrix 1 from the enclosed rhizome 4. The plant 2 grows upwardly from the rhizome 4.

As pointed out hereinbefore, the polyurethane foam should be predominantly open celled to facilitate passage of water, air and nutrient salts to the root system. Open cells can be obtained by using excess water but any other process which causes rupture of the cells can be used. Conventional fertilizer compositions and growing conditions such as light and temperature can be used with the matrix provided by the invention so the particular composition of the nutrient and particular growing conditions are not considered part of the invention and are not repeated here in detail from the prior art.

Although the invention has been described in considerable detail for the purpose of illustration, it is to be understood that variations can be made by those skilled in the art without departing from the spirit and scope of the invention.

The embodiments of the invention in which an exclusive property or privilege is claimed are defined as follows:

1. A process of growing plants which comprises spacing a plurality of plants over a surface, spreading a foamable liquid polyurethane reaction mixture adapted to form a foam containing open cells over the surface and about those portions of the plants which normally extend into a culture medium, allowing the mixture to react chemically and expand into a solid polyurethane foam matrix having open cells about the said portions of the plants, and thereafter feeding the plants with nutrient medium through the matrix.

2. The process of claim 1 wherein said plant portions are covered with a porous medium prior to application of the foaming mixture.

3. The process of claim 1 wherein the plants are orchids.

4. The process of claim 1 wherein the said foamable polyurethane reaction mixture contains as the polyisocyanate component thereof a mixture of diphenylmethane-4,4'-diisocyanate and polymers thereof.

5. The process of claim 4 wherein the resulting matrix has a density of from about 0.5 pound per cubic foot to about 3 pounds per cubic foot, the vertical thickness of the matrix is from about ½ to 10 inches and wherein said reaction mixture is selected to provide more than about 75 percent open cells in the matrix.

6. The process of claim 1 wherein the foamable mixture is sprayed about the plant and then foams to form the matrix.

7. The process of claim 1 wherein the foamable polyurethane reaction mixture contains polyoxyethylene-oxypropylene triol containing about 65 percent terminal primary hydroxyl groups, water and a mixture of diphenylmethane-4,4'-diisocyanate with its polymer.

References Cited

UNITED STATES PATENTS

| | | | |
|---|---|---|---|
| 2,965,584 | 12/1910 | Elkin | 47—1.2X |
| 2,971,292 | 2/1961 | Malecki | 47—58 |
| 2,988,441 | 6/1961 | Pruitt | 71—27 |
| 3,110,129 | 11/1963 | Baumann | 47—58 |

FOREIGN PATENTS

| | | | |
|---|---|---|---|
| 722,589 | 11/1965 | Canada | 47—Plastic |

ROBERT E. BAGWILL, Primary Examiner

U.S. Cl. X.R.

47—Dig. 7